United States Patent [19]
Beebe

[11] 4,121,540
[45] Oct. 24, 1978

[54] AIR-RETENTION SHELL
[76] Inventor: Michael V. Beebe, 507 Robin Rd., El Dorado, Ark. 71730
[21] Appl. No.: 850,633
[22] Filed: Nov. 11, 1977
[51] Int. Cl.$^2$ ............................................. A01K 31/18
[52] U.S. Cl. ............................................. 119/32; 52/82
[58] Field of Search ............... 119/30, 31, 32, 33, 119/34; 52/82, 22; 47/21, 29

[56] References Cited
U.S. PATENT DOCUMENTS

| | | | |
|---|---|---|---|
| 1,579,155 | 3/1926 | Sheer | 119/32 |
| 1,771,412 | 7/1930 | Longtin | 119/33 |
| 2,104,662 | 1/1938 | Meeks et al. | 119/32 |
| 2,266,934 | 12/1941 | Willett et al. | 119/33 |
| 3,336,704 | 8/1967 | Clay | 52/22 |
| 3,384,992 | 5/1968 | Heffron | 47/29 |

Primary Examiner—Jay N. Eskovitz
Attorney, Agent, or Firm—Finnegan, Henderson, Farabow & Garrett

[57] ABSTRACT

Air cooled or heated by a localized air-temperature-modifying unit suspended from an air-retention shell is temporarily retained by the shell, thereby reducing the energy consumption and improving the efficiency of the air-temperature-modifying means. The preferred air-temperature-modifying means suspended from the shell is a chicken house brooder. The shell is generally conical, faces downwardly, and is made of a highly heat-retentive material, such as foamed synthetic resinous material.

9 Claims, 3 Drawing Figures

AIR-RETENTION SHELL

Background of the Invention

The present invention relates to local, as opposed to central, heating and cooling systems. More particularly, this invention relates to an air-retention shell that greatly improves the efficiency of local air-temperature modification systems. The invention is particularly well suited for decreasing the energy consumption of brooders, such as chicken house brooders.

Brooders are used to uniformly maintain a predetermined temperature for young animals, such as baby chicks and other poultry, and to satisfy their instinctive need for an overhead hover. Thus, conventional brooders include a hover or canopy over a gas or electric infrared heater. A brooder is positioned immediately above the chicks, sometimes only an inch or two above the ground, to provide an occupancy zone for the brooding animals. The hover of the brooder functions both to satisfy the animals' instinctive necessity for an overhead cover and to direct and reflect the heat in a downward direction onto the animals.

Because brooders currently on the market are not designed to retain heat and are usually used under conditions in which there is a large temperature difference between the area outside of the occupancy zone and the area within the occupancy zone, the rate of heat loss from the brooder is quite high, causing energy consumption by the brooder to be correspondingly high.

An object of this invention is therefore to reduce energy consumption by localized heating or cooling systems, especially chicken house brooders.

Additional objects and advantages of the invention will be set forth in part in the description which follows, and in part will be obvious from the description, or may be learned by the practice of the invention. The objects and advantages of the invention may be realized and attained by means of the instrumentalities and combinations particularly pointed out in the appended claims.

SUMMARY OF THE INVENTION

To achieve the foregoing objects and in accordance with the purpose of the invention, as embodied and broadly described herein, the air-retention device of the present invention is designed for suspension above an air-temperature-modifying means, and comprises a generally conical shell having a single open end that faces downwardly and being made of a highly heat-retentive material, means for suspending the shell above the air-temperature-modifying means, and means for suspending the air-temperature-modifying means from and below the shell.

In a further aspect, the invention comprises a heating system comprising the aforementioned shell and a heating means suspended by the means for suspending the air-temperature-modifying means. Preferably, the heating means is a brooder that includes a hover.

It is also preferred that the heat-retentive material be a foamed synthetic resinous material.

It is also preferred that the shell include a plurality of substantially identical trapezoidal faces connected at the top of the shell by a polygonal crown whose number of sides equals the number of the trapezoidal faces of the shell.

The invention consists in the novel parts, constructions, arrangements, combinations and improvements shown and described. The accompanying drawings, which are incorporated in and constitute a part of this Specification, illustrate one embodiment of the invention and, together with the description, serve to explain the principles of the invention.

Reference will now be made in detail to the presently preferred embodiment of the invention, an example of which is illustrated in the accompanying drawings.

Figure 1:
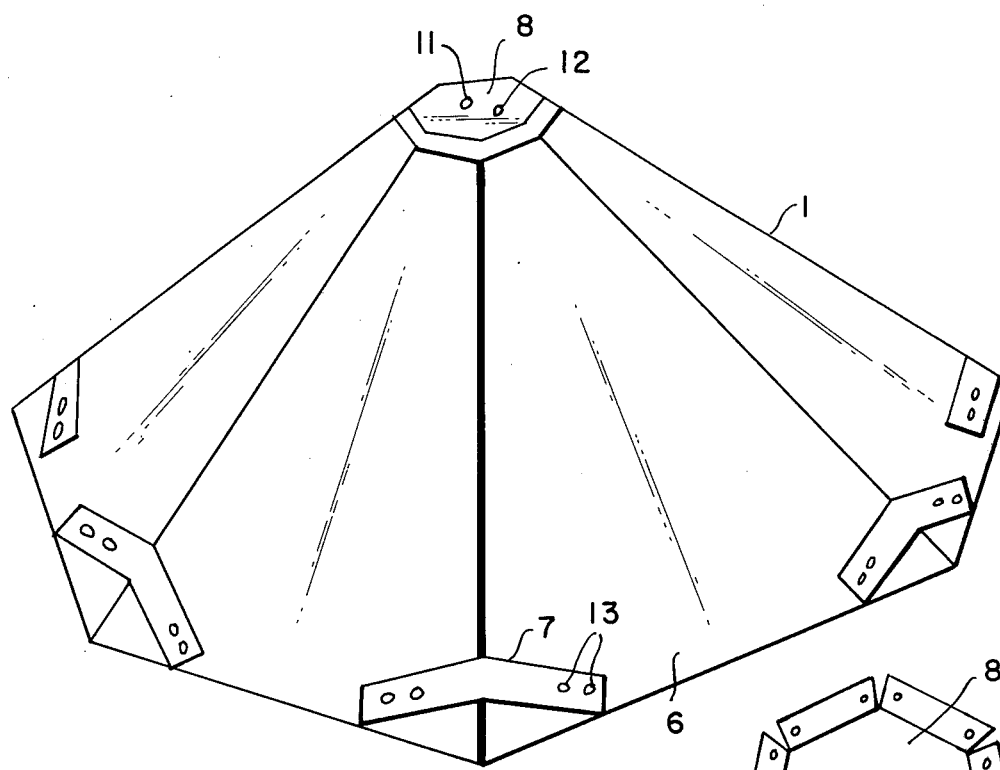
FIG. 1 is a top perspective view of an air-retention shell constructed in accordance with the present invention.
Figure 2:
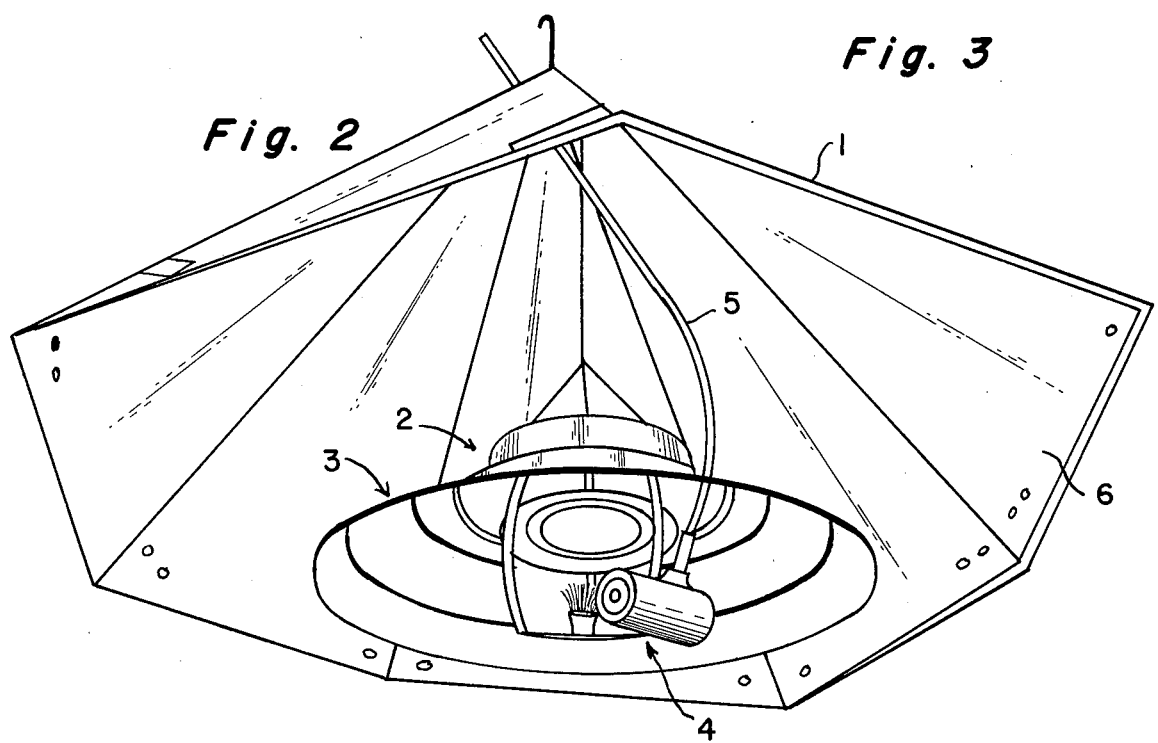
FIG. 2 is a bottom perspective view of the shell of FIG. 1 in combination with a conventional chicken house brooder.

Referring now to FIGS. 1 and 2, it may seem that the air-retention device of the present invention is adapted to be suspended above an air-temperature-modifying means. As embodied herein, the air-temperature-modifying means is a heating means, and more specifically, a chicken house brooder 2. The brooder includes a hover 3, and a heater 4. The brooder is supplied with fuel through line 5.

Although the brooder illustrated in the drawing is a gas-burning brooder, any conventional brooder, such as gas-burning brooders and electric infrared emitting brooders may be used. One such brooder is the Hoyt Model No. 6041, manufactured by Hoyt Corporation. Convention brooders that may be used in this invention are further exemplified by U.S. Pat. No. 3,691,996 to Bowell; U.S. Pat No. 2,909,152 to Cordis; U.S. Pat No. 3,897,752 to Greene; and U.S. Pat. No. 2,848,591 to Taylor.

As shown in FIGS. 1 and 2, the heat or air-retention device of the present invention further includes a generally conical shell 1 having a single open end. As embodied herein, the shell comprises a plurality of generally triangular faces 6, more specifically, seven identically shaped trapezoids whose shortest edges are interconnected by a crown 8 having seven sides.

The trapezoidal faces are constructed from a highly heat-retentive material, such as an expanded or foamed synthetic resinous material, e.g. Styrofoam. Of course, any suitable material conducive to heat retention could be used, such as a plastic construction using dead air space.

The faces 6 and crown 8 may be united in any suitable manner. As shown in FIG. 1, the faces 6 are united with straps, such as light aluminum straps, 7 and bolts 13.

Figure 3:
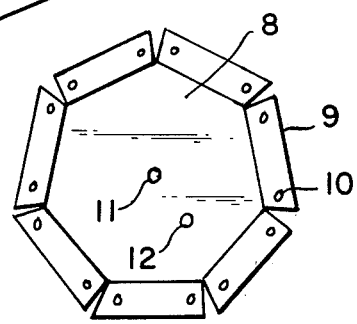
FIG. 3 is an exploded plan view of the crown or top of the shell of FIG. 1.

As illustrated in FIG. 3, crown 8 is provided with flaps 9 for connection by means of bolts 10 with faces 6. As embodied herein, the means for suspending the brooder from the shell and the means for suspending the shell above the brooder are a hole 11 in the crown. Of course, separate means for suspending the shell and the brooder could be provided, such as separate holes in the crown. The crown has a second hole 12 for a gas or electrical supply line for the brooder. The crown can be made from any suitable material, such as 22 gauge galvanized metal.

The dimensions of the shell 1 can vary depending on the size of the brooder and the area to be heated. In one working model, the dimensions were as follows:

| Face 6 | |
|---|---|
| Longest edges | 52 inch |
| Shortest edges | 6 inch |
| Intermediate edge | 47.5 inch |
| Thickness | 1 inch |
| Straps 7 | |
| Length | 27 inch |
| Width | 4 inch |
| Shell 1 | |
| Height | 3 feet |
| Maximum width | 8 feet, 9 inch |
| Crown 8 | |
| Maximum dimension | 15 inch |
| Tabs 9 | |
| Length | 8.25 inch |
| Width | 2 inch |

In operation the brooder is suspended about 10 inches below the shell. This distance can vary depending upon the conditions, however, and the optimum distance can be easily determined.

Use of the shell substantially reduces energy consumption by the brooder or other air-temperature-modifying means. The shell functions to control air movement to cause temporary air retention. The shell layers the heat produced by the brooder and retains displaced heat lost by the hover of the brooder by creating a heat zone under the shell. This increases the efficiency of the brooder and, therefore, reduces its energy consumption.

The improved efficiency achieved with the present invention is amply demonstrated by the following examples, in each of which two identical chicken house brooders manufactured by Hoyt Corporation were used, one with a shell as described herein, and one without a shell. The brooders were of the individually, thermostatically-controlled type. Upon achieving the set temperature, the main burner of the brooder would automatically shut off, leaving only the pilot light burning. In each example, the ambient temperature range, TR, the amount of time, T, the thermostat setting, TS, and the amount of LP gas consumed, G, for the test were recorded. The results are set forth in Table I below.

TABLE I

| Example | TR(° F) | T(hrs) | TS(° F) | G(ft³) | ΔG/hr |
|---|---|---|---|---|---|
| Invention 1 | 40–45 | 2.92 | 74 | 19 | |
| Control 1 | 40–45 | 2.92 | 74 | 23 | 1.37 |
| Invention 2 | 43–50 | 3.75 | 82 | 23 | |
| Control 2 | 43–50 | 3.75 | 82 | 27 | 1.07 |
| Invention 3 | 79–90 | 23 | 82 | 44 | |
| Control 3 | 79–90 | 23 | 82 | 49 | 0.22 |

In the case of Example 1, more than a 17% reduction in energy consumption was realized. The examples demonstrate that the lower the ambient or outside temperature, the greater the amount of energy required to operate the brooder and the greater the amount of energy savings achieved with the shell of the present invention. These results are achieved by the control of air movement, either hot or cold, by temporarily retaining the air before it is released to the uncontrolled ambient atmosphere.

Although the preferred use of the present invention is for reducing energy consumption in chicken house brooders, energy reduction resulting from air retention with the present invention may also be achieved by use of the shell over brooders in turkey houses, hog houses, or any place where small or baby animals are brooded or grown under conditions of localized, rather than centralized, heating or cooling. Furthermore, the shell may be used to temporarily retain air in amusement parks, open-air pavilions, or other sites where air used for heating or cooling is discharged to the atmosphere. Use in hot-houses or greenhouses over plants is also feasible.

It will be apparent to those skilled in the art that various modifications and variations can be made in the air-retention device and heating system of the present invention without departing from the scope or spirit of the invention. For example, the shell 1 could have a bowl configuration, rather than the configuration of the preferred embodiment illustrated in the drawings. Similarly, the pyramidally-shaped shell illustrated could have fewer or more faces than the embodiment shown herein. Thus, it is intended that the present invention cover the modifications and variations of this invention provided they come within the scope of the appended claims and their equivalents.

What is claimed is:

1. A heating system comprising:
   (a) a generally conical heat-retention shell having a single open end, said open end facing downwardly, said shell being made of a highly heat-retentive material;
   (b) means for suspending said shell above the ground; and
   (c) a brooder removably suspended below said shell and spaced from said shell, said brooder comprising a heater and a hover, whereby said shell retains heat lost from the top and heat passing the outer perimeter of said hover.

2. The heating system of claim 1, wherein said material is a foamed synthetic resinous material.

3. The heating system of claim 1, wherein said shell comprises a plurality of generally triangular faces.

4. The heating system of claim 3, wherein each of said faces is a substantially identical trapezoid, said shell further comprising a crown at the top of said shell, said crown being a polygon with a number of sides equal to the number of said faces, each side being interconnected with the shortest edge of one of said faces.

5. The heating system of claim 4, wherein said shell has a maximum height of about 3 feet and a maximum width of about 9 feet.

6. The heating system of claim 4, wherein said shell has seven of said faces.

7. The heating system of claim 6, wherein said brooder is suspended about 10 inches below said shell.

8. The heating system of claim 4, wherein said shell is substantially larger in height and width than said brooder.

9. The heating system of claim 8, wherein said brooder is a chicken-house brooder.

* * * * *